(12) United States Patent
Sayenko et al.

(10) Patent No.: US 10,999,757 B2
(45) Date of Patent: May 4, 2021

(54) METHOD AND APPARATUS FOR REDUCING PROCESSING LOAD BETWEEN TERMINAL AND BASE STATION WHEN APPLYING NEW QOS MODEL IN NEXT-GENERATION MOBILE COMMUNICATION SYSTEM

(71) Applicant: Samsung Electronics Co., Ltd., Gyeonggi-do (KR)

(72) Inventors: Alexander Sayenko, Seoul (KR); Seungri Jin, Gyeonggi-do (KR); Donggun Kim, Seoul (KR)

(73) Assignee: Samsung Electronics Co., Ltd.

( * ) Notice: Subject to any disclaimer, the term of this patent is extended or adjusted under 35 U.S.C. 154(b) by 27 days.

(21) Appl. No.: 15/934,305

(22) Filed: Mar. 23, 2018

(65) Prior Publication Data

US 2018/0279160 A1 Sep. 27, 2018

(30) Foreign Application Priority Data

Mar. 23, 2017 (KR) .......................... 10-2017-0036627

(51) Int. Cl.
| | | |
|---|---|---|
| H04W 28/02 | (2009.01) | |
| H04W 72/04 | (2009.01) | |
| H04W 88/02 | (2009.01) | |
| H04L 29/06 | (2006.01) | |
| H04L 1/18 | (2006.01) | |

(52) U.S. Cl.
CPC ....... H04W 28/0268 (2013.01); H04L 1/1835 (2013.01); H04L 69/04 (2013.01); H04W 72/0406 (2013.01); H04W 88/023 (2013.01); H04L 1/1874 (2013.01)

(58) Field of Classification Search
None
See application file for complete search history.

(56) References Cited

U.S. PATENT DOCUMENTS

| | | | |
|---|---|---|---|
| 2014/0233380 A1 | 8/2014 | Kim et al. | |
| 2016/0309379 A1* | 10/2016 | Pelletier | ................ H04W 76/27 |
| 2018/0213540 A1* | 7/2018 | Chiu | ...................... H04W 28/02 |

(Continued)

OTHER PUBLICATIONS

3GPP TS 24.139 ver 13.1 release Jul. 13, 2016 "Fixed Broadband Access Network Interworking" (Year: 2016).*

(Continued)

*Primary Examiner* — Jeffrey M Rutkowski
*Assistant Examiner* — Basil Ma
(74) *Attorney, Agent, or Firm* — The Farrell Law Firm, P.C.

(57) ABSTRACT

Disclosed is a communication method and system for converging a fifth generation (5G) communication system for supporting higher data rates beyond a fourth generation (4G) system with the Internet of things (IoT) technology. The present disclosure may be applied to intelligent services based on 5G and based on the 5G communication technology and the IoT-related technology, such as smart home, smart building, smart city, smart car or connected car, health care, digital education, smart retail, security and safety services. The present disclosure relates to a next-generation mobile communication system, and more particularly, to a method for providing a flow-based quality of service (QoS).

16 Claims, 13 Drawing Sheets

(56) References Cited

U.S. PATENT DOCUMENTS

2018/0234876 A1* 8/2018 Jheng .................. H04L 47/2441

OTHER PUBLICATIONS

R2-1700842 "QoS framework for NR" 3GPP TSG-RAN WG2 #97 (Year: 2017).*
Samsung, "Extending Reflective QoS Scheme to Support for Asymmetric QoS", S2-166452, SA WG2 Meeting #S2-118, Nov. 14-18, 2016, 7 pages.
Huawei, HiSilicon, "Interim Agreement on Reflective QoS", S2-166438, SA WG2 Meeting #118, Nov. 14-18, 2016, 7 pages.
Samsung, "Uplink Reflective QoS", S1-166597, SA WG2 Meeting #118, Nov. 14-18, 2016, 8 pages.
Samsung, "NR QOS—AS Handling of a New QOS Flow", R2-1700030, 3GPP TSG-RAN WG2 Meeting #96bis, Jan. 17-19, 2017, 4 pages.
International Search Report dated Jul. 2, 2018 issued in counterpart application No. PCT/KR2018/003421, 3 pages.
Ericsson, "QoS Framework for NR", R2-1700842, 3GPP TSG-RAN WG2 #97, Feb. 13-17, 2017, 6 pages.
ITRI, "Discussion on QoS Flow ID", R2-1701346, 3GPP TSG-RAN WG2 Meeting #97, Feb. 13-17, 2017, 3 pages.
European Search Report dated Oct. 9, 2019 issued in counterpart application No. 18770484.6-1215, 10 pages.

* cited by examiner

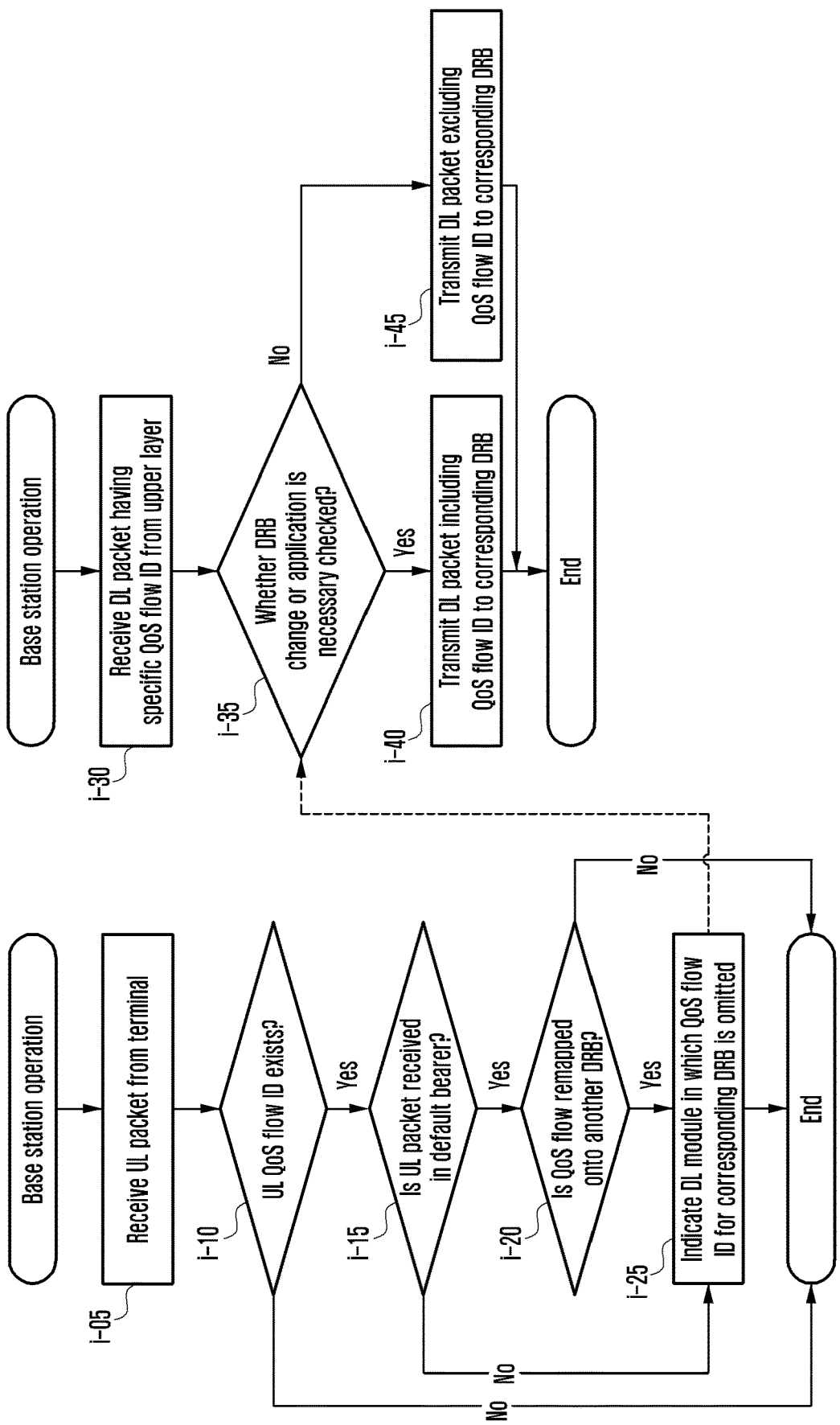

METHOD AND APPARATUS FOR REDUCING PROCESSING LOAD BETWEEN TERMINAL AND BASE STATION WHEN APPLYING NEW QOS MODEL IN NEXT-GENERATION MOBILE COMMUNICATION SYSTEM

CROSS-REFERENCE TO RELATED APPLICATION(S)

This application is based on and claims priority under 35 U.S.C. § 119 to Korean Patent Application No. 10-2017-0036627, filed on Mar. 23, 2017 in the Korean Intellectual Property Office, the disclosure of which is incorporated by reference herein in its entirety.

BACKGROUND

1. Field of the Disclosure

The present disclosure relates generally to a next-generation mobile communication system, and more particularly, to a method and an apparatus for providing a flow-based quality of service (QoS).

2. Description of the Related Art

In order to meet the demand for wireless data traffic that is increasing pursuant to the commercialization of fourth generation (4G) communication systems, efforts have been made to develop an improved fifth generation (5G) or pre-5G communication system. For this reason, the 5G or pre-5G communication system is also, a beyond 4G network communication system or a post LTE system.

In order to achieve a high data rate, implementation of a 5G communication system in an ultrahigh frequency (mm-Wave) band, such as a 60 gigahertz (GHz) band, has been considered. In order to mitigate a path loss of radio waves and to increase a transfer distance of the radio waves in the ultrahigh frequency band, technologies such as beamforming, massive multiple input multiple output (MIMO), full dimension MIMO (FD-MIMO), array antennas, analog beamforming, and large scale antennas for the 5G communication system have been discussed.

For system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP), and reception interference cancellation.

In addition, in the 5G system, hybrid frequency shift keying (FSK) and quadrature amplitude modulation (QAM), frequency QAM (FQAM) and sliding window superposition coding (SWSC), which correspond to advanced coding modulation (ACM) systems, and filter bank multicarrier (FBMC), non-orthogonal multiple access (NOMA), and sparse code multiple access (SCMA), which correspond to advanced connection technologies, have been developed.

Meanwhile, the Internet, which is a human centered connectivity network where information is generated and consumed, is now evolving to the Internet of things (IoT) where distributed entities, such as things, exchange and process information. Also emerging is the Internet of everything (IoE), which is a combination of the IoT technology and big data processing technology through connection with a cloud server. As sensing technology, wired/wireless communication and network infrastructure, service interface technology, and security technology have been demanded for IoT implementation, a sensor network for machine-to-machine connection, machine-to-machine (M2M) communication, and machine type communication (MTC), has been actively researched.

Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between the existing IT and various industries.

Accordingly, various attempts have been made to apply the 5G communication system to IoT networks. For example, technologies of sensor network, machine to machine (M2M) communication, and MTC have been implemented by techniques for beam-forming, MIMO, and array antennas, which correspond to the 5G communication technology. In the big data processing technology as described above, application of a cloud RAN is an example of convergence between the 5G and IoT technologies.

However, in the next-generation mobile communication system, unsolved problems in providing a flow-based QoS persist, unlike the existing long term evolution (LTE) system, and there is a lack of an efficient interface supporting the flow-based QoS.

As such, there is a need in the art to provide an efficient method for improving processing in the next-generation mobile communication system, and to provide a terminal to perform mapping of a QoS flow onto a data radio bearer (DRB).

SUMMARY

The present disclosure is designed to address at least the problems and/or disadvantages described above and to provide at least the advantages described below.

Accordingly, an aspect of the disclosure is to provide a method for reducing a processing load between a terminal and a base station when applying a flow-based QoS model.

In accordance with an aspect of the disclosure, a method by a base station in a wireless communication system includes transmitting, to a terminal, a first packet including a first header related to a data radio bearer, receiving, from the terminal, a second packet corresponding to the first packet, and determining a second header included in a third packet to be transmitted to the terminal based on the second packet, wherein the first header and the second header include a QoS flow identifier (ID) and a reflective QoS indicator.

In accordance with another aspect of the disclosure, a method by a terminal in a wireless communication system includes receiving, from a base station, a first packet including a header which includes a QoS flow ID and a reflective QoS indicator, mapping the QoS flow ID to a data radio bearer to which the first packet is transmitted and storing the mapped QoS flow ID, and transmitting, to the base station, a predetermined second packet corresponding to the first packet.

In accordance with another aspect of the disclosure, a base station in a wireless communication system includes a transceiver, and a controller coupled with the transceiver and configured to control the transceiver to transmit to a terminal a first packet including a first header related to a data radio bearer, control the transceiver to receive from the terminal a second packet corresponding to the first packet, and determine a second header included in a third packet to be transmitted to the terminal based on the second packet, wherein the first header and the second header include a QoS flow ID and a reflective QoS indicator.

In accordance with another aspect of the disclosure, a terminal in a wireless communication system includes a transceiver, and a controller coupled with the transceiver to configured to control the transceiver to receive from a base station a first packet in which a QoS flow ID and a reflective QoS indicator are included in a header, map the QoS flow ID to a data radio bearer to which the first packet is transmitted and store the mapped QoS flow ID, and control the transceiver to transmit to the base station a predetermined second packet corresponding to the first packet.

BRIEF DESCRIPTION OF THE DRAWINGS

The above and other aspects, features, and advantages of certain embodiments will be more apparent from the following detailed description taken in conjunction with the accompanying drawings, in which:

FIG. 9 illustrates the overall operation of a base station and mapping a QoS flow ID onto a DRB and interrupting marking of the QoS flow ID in accordance with a message received from a terminal according to the present disclosure;

DETAILED DESCRIPTION

Figure 1:
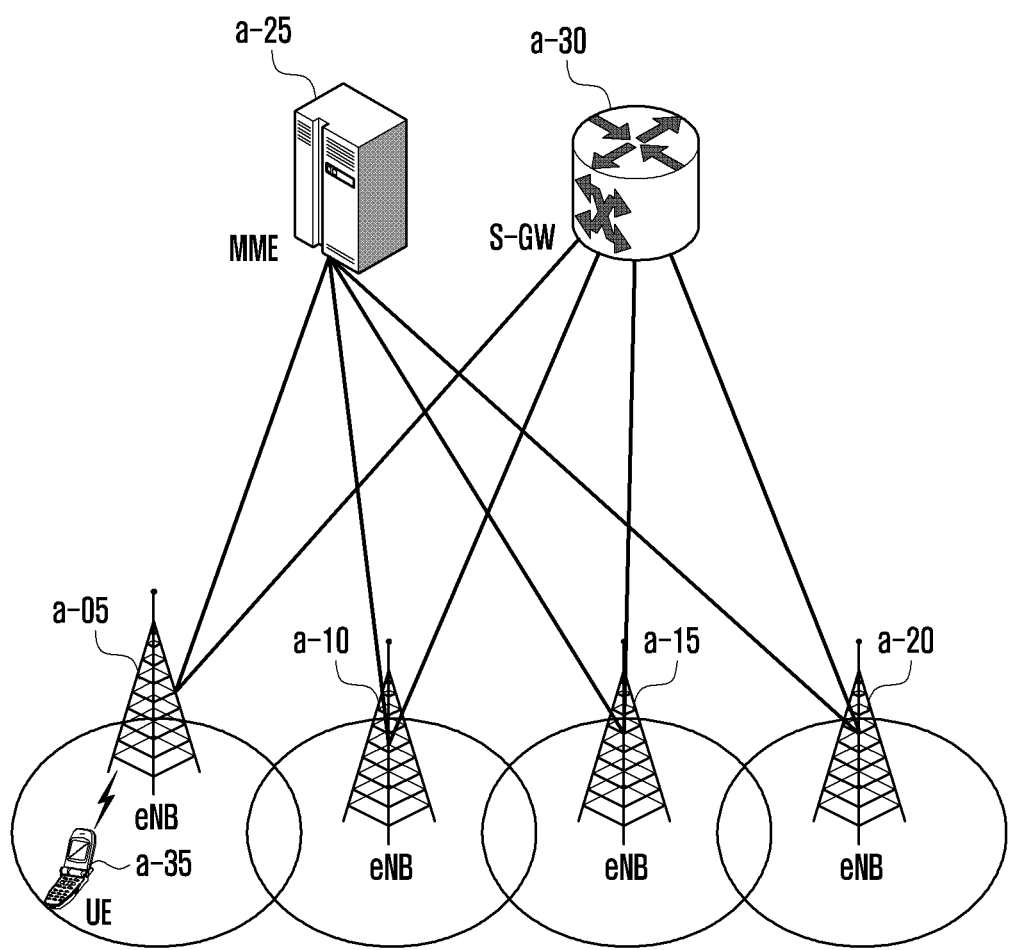
FIG. 1 illustrates the structure of an LTE system to which the disclosure is applied.

Embodiments of the present disclosure will be described in detail with reference to the accompanying drawings. A description of well-known functions or configurations incorporated herein are not described in detail for the sake of clarity and conciseness.

Terms are defined in consideration of their functions in the present disclosure, but may differ depending on intentions of a user and an operator or customs. Accordingly, the terms herein should be defined in light of the entire description.

The present disclosure is not limited to the embodiments disclosed hereinafter, but can be implemented in various forms. The matters defined in the description, such as the detailed construction and elements, are details provided to assist those of ordinary skill in the art in a comprehensive understanding of the disclosure. In the description, the same drawing reference numerals are used for the same elements.

Hereinafter, terms to be described are defined in consideration of their functions in the present disclosure, but may differ depending on intentions of a user and an operator or customs. Accordingly, the terms are defined based on the contents of the entire description.

Hereinafter, terms are described for identifying a connection node, network entities, an interface between network entities, and various pieces of identification information. Accordingly, the present disclosure is not limited to the terms to be described, but other terms for identifying subjects having identical technical meanings may be used.

For convenience of explanation, although terms and titles that are defined in the $3^{rd}$ generation partnership project (3GPP) LTE standards are used herein, the present disclosure is not limited by the terms and titles, but can be identically applied to systems following other standards.

In the next-generation mobile communication system, terminal complexity can be reduced by enabling a radio interface to support the flow-based QoS and preventing a QoS flow identifier (ID) and a terminal having received the QoS flow ID from repeating unnecessary operations during DRB mapping.

FIG. 1 illustrates the structure of an LTE system to which the present disclosure is applied.

Referring to FIG. 1, a radio access network of an LTE system includes evolved node Bs (hereinafter, "eNBs", "node Bs", or "base stations") a-05, a-10, a-15, and a-20, a mobility management entity (MME) a-25, and a serving-gateway (S-GW) a-30. User equipment (hereinafter, "UE" or "terminal") a-35 accesses to an external network through the eNBs a-05 to a-20 and the S-GW a-30.

In FIG. 1, the eNBs a-05 to a-20 correspond to an existing node B of a universal mobile telecommunication system (UMTS). The eNBs are connected to the UE a-35 on a radio channel, and play a more complicated role than that of the existing node B. In the LTE system, since all user traffic including a real-time service, such as a voice over internet protocol (VoIP) through an internet protocol, are serviced on shared channels, devices performing scheduling through summarization of state information, such as a buffer state, an available transmission power state, and a channel state of each UE, are necessary, and the eNBs a-05 to a-20 correspond to such scheduling devices. In general, one eNB controls a plurality of cells. For example, in order to implement a transmission speed of 100 megabits per second (Mbps), the LTE system uses, for example, orthogonal frequency division multiplexing (OFDM) in a bandwidth of 20 megahertz (MHz) as a radio access technology.

The LTE system adopts an adaptive modulation & coding (AMC) scheme that determines a modulation scheme and a channel coding rate to match the channel state of the terminal. The S-GW a-30 provides a data bearer, and generates or removes the data bearer under the control of the MME a-25, which controls mobility management of the terminal and various control functions, and is connected to the plurality of base stations.

Figure 2:
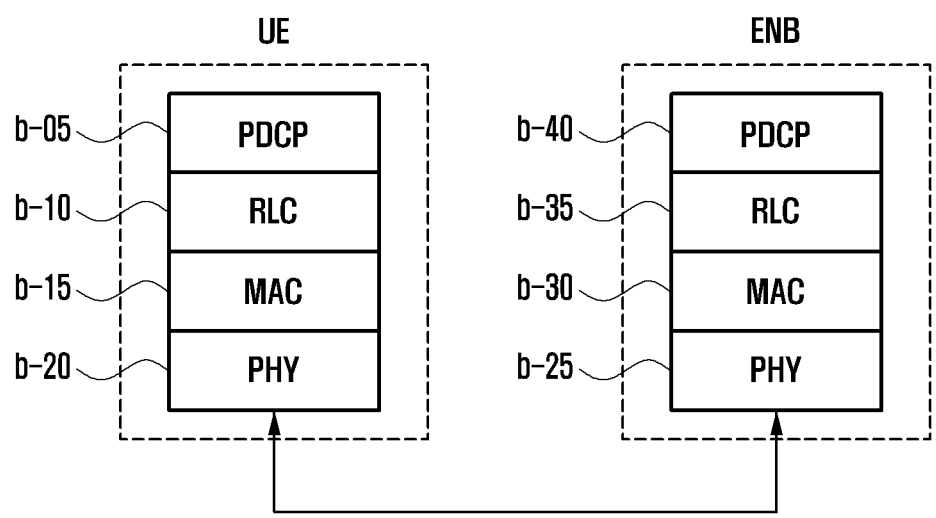
FIG. 2 illustrates a radio protocol structure in an LTE system to which the disclosure is applied.

FIG. 2 illustrates a radio protocol structure in an LTE system to which the present disclosure is applied.

Referring to FIG. 2, in a terminal or an eNB, a radio protocol of an LTE system is composed of a packet data convergence protocol (PDCP) b-05 or b-40, a radio link control (RLC) b-10 or b-35, a medium access control (MAC) b-15 or b-30, and a physical layer (PHY) b-20 or b-25. The PDCP b-05 or b-40 controls IP header compression/decompression operations and has the following main functions:

Header compression and decompression—robust header compression (ROHC) only
Transfer of user data
In-sequence delivery of upper layer packet data units (PDUs) at a PDCP reestablishment procedure for an RLC acknowledged mode (AM)—For split bearers in dual connectivity (DC) (only support for an RLC AM)—PDCP PDU routing for transmission and PDCP PDU reordering for reception
Duplicate detection of lower layer SDUs at a PDCP reestablishment procedure for an RLC AM
Retransmission of PDCP SDUs at handover and, for split bearers in DC, of PDCP PDUs at a PDCP data-recovery procedure, for an RLC AM
Ciphering and deciphering
Timer-based SDU discard in an uplink The RLC b-10 or b-35 reconfigures a PDCP PDU with a proper size, performs an automatic repeat request (ARQ) operation, and has the following main functions.

Transfer of upper layer PDUs
Error correction through an ARQ (only for AM data transfer)
Concatenation, segmentation, and reassembly of RLC SDUs (only for UM and AM data transfer)
Re-segmentation of RLC data PDUs (only for UM and AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM transfer)
RLC reestablishment The MAC b-15 or b-30 is connected to several RLC layer devices configured in one terminal, performs multiplexing/demultiplexing of RLC PDUs into/from MAC PDU, and has the following main functions.

Mapping between logical channels and transport channels
Multiplexing/demultiplexing of MAC SDUs belonging to one or different logical channels into/from transport blocks (TB) transferred to/from the physical layer on transport channels
Scheduling information reporting
HARQ function (error correction through HARQ)
Priority handling between logical channels of one UE
Priority handling between UEs by means of dynamic scheduling
MBMS service identification
Transport format selection
padding The PHY b-20 or b-25 performs channel coding and modulation of upper layer data to configure and transmit OFDM symbols on a radio channel, or performs demodulation and channel decoding of the OFDM symbols received on the radio channel to transfer the demodulated and channel-decoded symbols to an upper layer.

Figure 3:
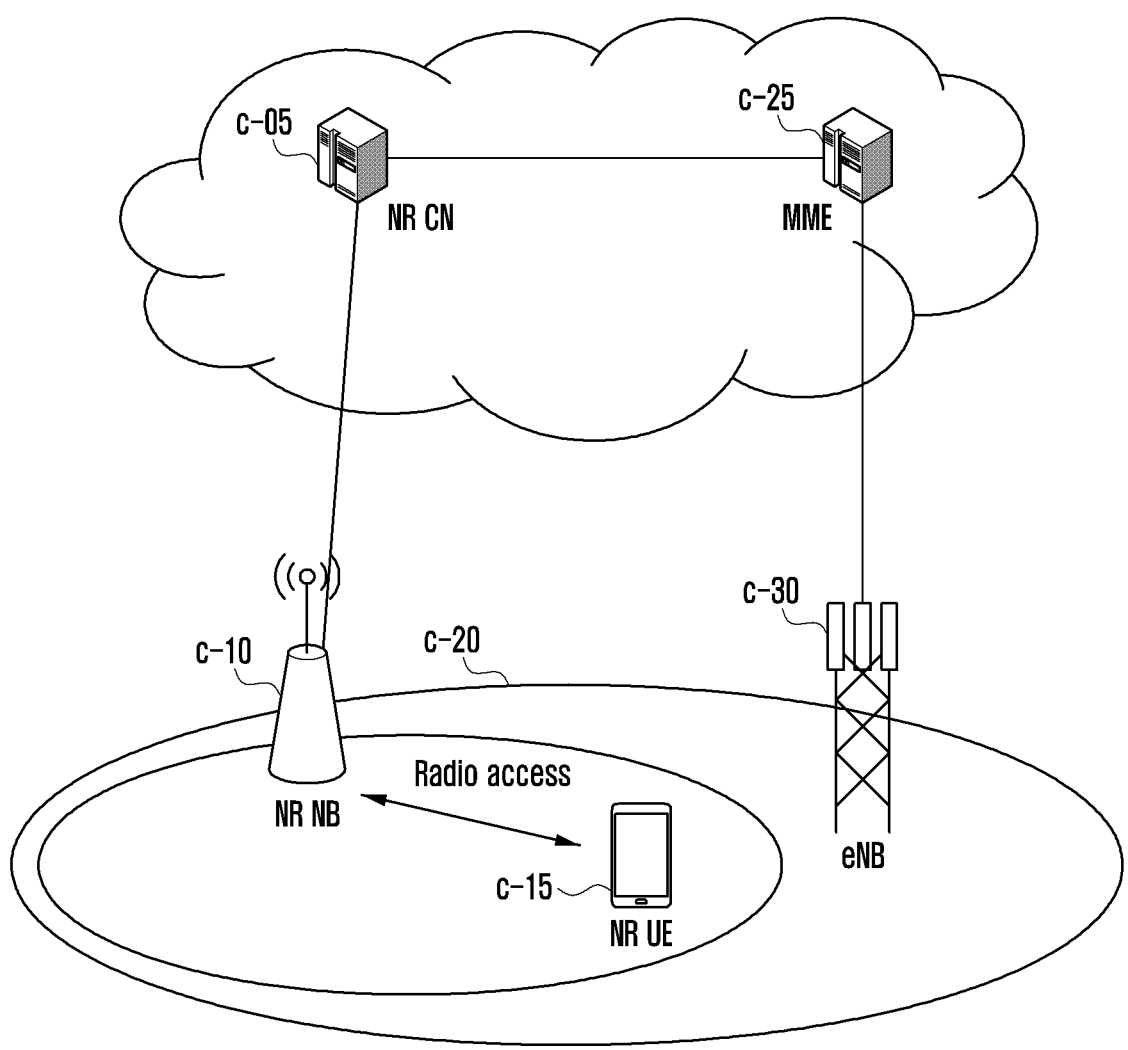
FIG. 3 illustrates the structure of a next-generation mobile communication system to which the disclosure is applied.

FIG. 3 illustrates the structure of a next-generation mobile communication system to which the present disclosure is applied.

Referring to FIG. 3, a radio access network of a next-generation mobile communication system is composed of a new radio node B (hereinafter, NR next generation node B (gNB) "NR gNB" or "NR eNB") c-10 and a new radio core network (NR CN) c-05. A new radio user equipment (hereinafter, "NR UE" or "terminal") c-15 accesses an external network through the NR gNB c-10 and the NR CN c-05.

In FIG. 3, the NR gNB c-10 corresponds to an eNB of the existing LTE system, is connected to the NR UE c-15 on a radio channel, and thus can provide a more superior service than the service of the existing node B. Since all user traffic is serviced on shared channels in the next-generation mobile communication system, there is required a device that performs scheduling through consolidation of status information, such as buffer states of UEs, an available transmission power state, and a channel state, which is controlled by the NR NB c-10.

One NR gNB c-10 generally controls a plurality of cells. In order to implement ultrahigh-speed data transmission as compared with the existing LTE, the NR gNB may have a bandwidth that is equal to or higher than the existing maximum bandwidth, and a beamforming technology may be additionally grafted in consideration of OFDM as a radio access technology.

Disclosed herein is an AMC scheme determining a modulation scheme and a channel coding rate to match the channel state of the UE. The NR CN c-05 performs mobility support, bearer setup, and QoS configuration, various types of control functions, and is connected to a plurality of eNBs. The next-generation mobile communication system may interlock with the existing LTE system, and the NR CN is connected to an MME c-25 through a network interface. The MME c-25 is connected to an eNB c-30 that is the existing eNB.

Figure 4:
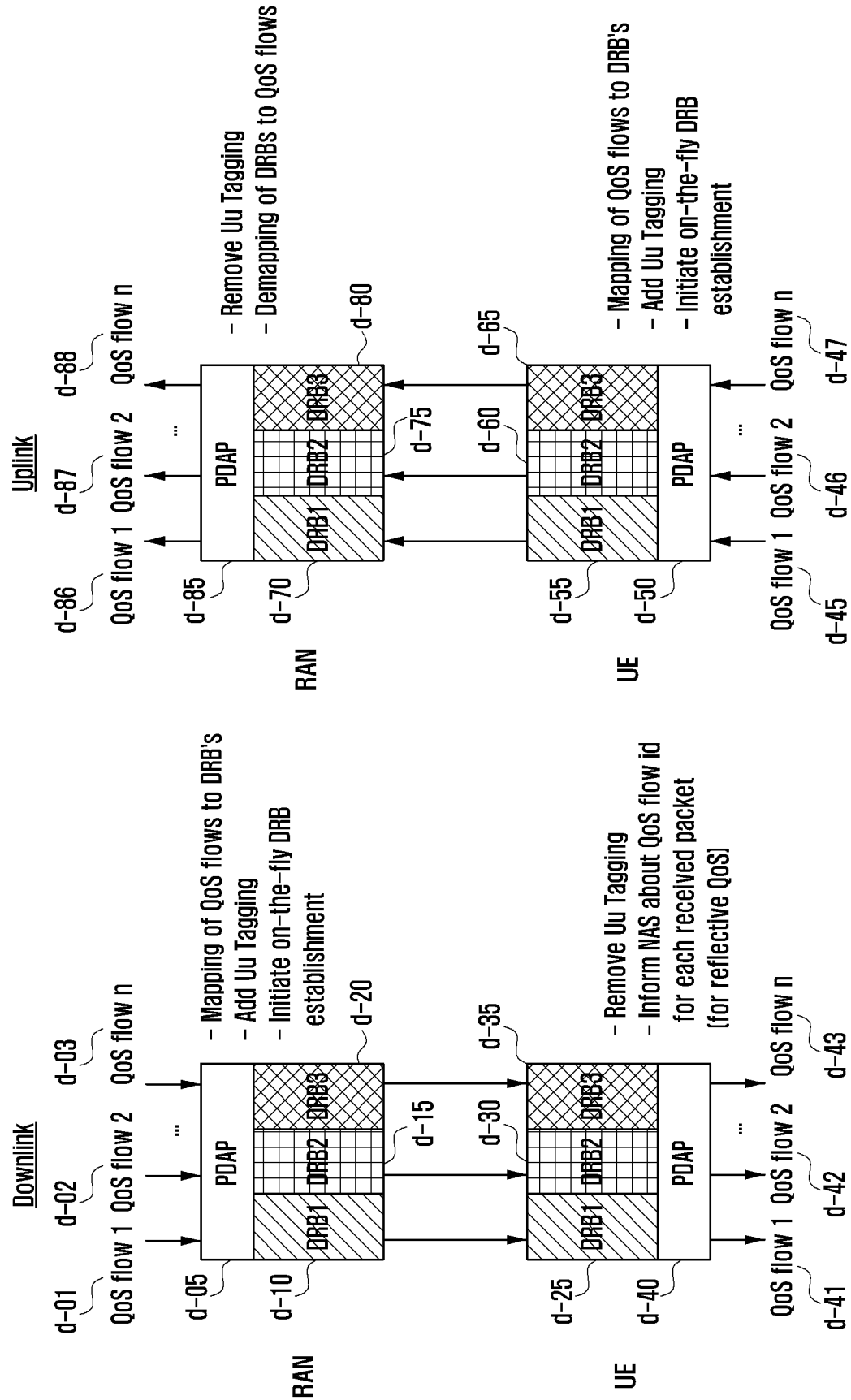
FIG. 4 illustrates new functions for handling a QoS in a new radio (NR) system according to embodiments.

FIG. 4 illustrates new functions for handling a QoS in an NR system according to embodiments.

An NR system should configure a user traffic transmission path in accordance with a service for requesting different QoSs, that is, in accordance with QoS requirements, or control an IP flow for each service. An NR core network may configure a plurality of PDU sessions that may each include a plurality of IP flows.

An NR gNB may perform mapping of a plurality of QoS flows onto a plurality of DRBs, and may configure the QoS flows simultaneously. That is, since with respect to a downlink, a plurality of QoS flows d-01, d-02, and d-03 may be mapped onto the same DRB or different DRBs d-10, d-15, and d-20, the QoS flow ID should be marked on the downlink packet for discrimination. The DRB mapping may be specifically configured through a radio resource control (RRC) control message.

Since the above-described function is not provided in the existing LTE PDCP protocol, a new packet data association protocol (PDAP) d-05, d-40, d-50, and d-85 is introduced for controlling this, or a new function is performed to the PDCP. The PDAP protocol is defined as a service data adaptation protocol (SDAP) in an NR, and in the present disclosure, the PDAP corresponds to the SDAP in the NR, and the PDAP and the SDAP have the same meaning.

The above-described marking permits implementation of a reflective QoS with respect to an uplink. The above-described QoS indicates a mapping method enabling the terminal to perform uplink transmission through the DRB on which a downlink packet having a specific flow ID transmitted by the gNB is transmitted. The specific marking of the QoS flow ID on the downlink packet as described above is a simple method for an access stratum (AS) of the terminal to provide the information to a non-access stratum (NAS) of the terminal. A method for mapping IP flows onto DRBs in a downlink may be performed in the following two stages.

1. NAS level mapping: IP flow→QoS flow
2. AS level mapping: QoS flow→DRB

During the downlink reception, existence/nonexistence of QoS flow mapping information and reflective QoS operation can be received for respective received DRBs d-25, d-30, and d-35, and corresponding information can be transferred to the NAS.

As for the uplink, two-stage mapping may be used in the same manner as the downlink. First, IP flows are mapped onto the QoS flows (d-45, d-46, d-47) through NAS signaling, and the AS performs mapping of the QoS flows onto determined DRBs d-55, d-60, and d-65. The terminal may mark the QoS flow ID on the uplink packet, or may transfer the packet as it is without marking the QoS flow ID. The above-described function is performed by the PDAP of the terminal. If the QoS flow ID is marked on the uplink packet, the base station may mark the QoS flow ID on the packet transferring the information to a next generation user equipment (NG-U) without a traffic flow template (TFT). Demapping of DRBs (d-70, d-75, d-80) to QoS flows (D-86, D-87, D-88) is performed in NR gNB.

Figure 5A:
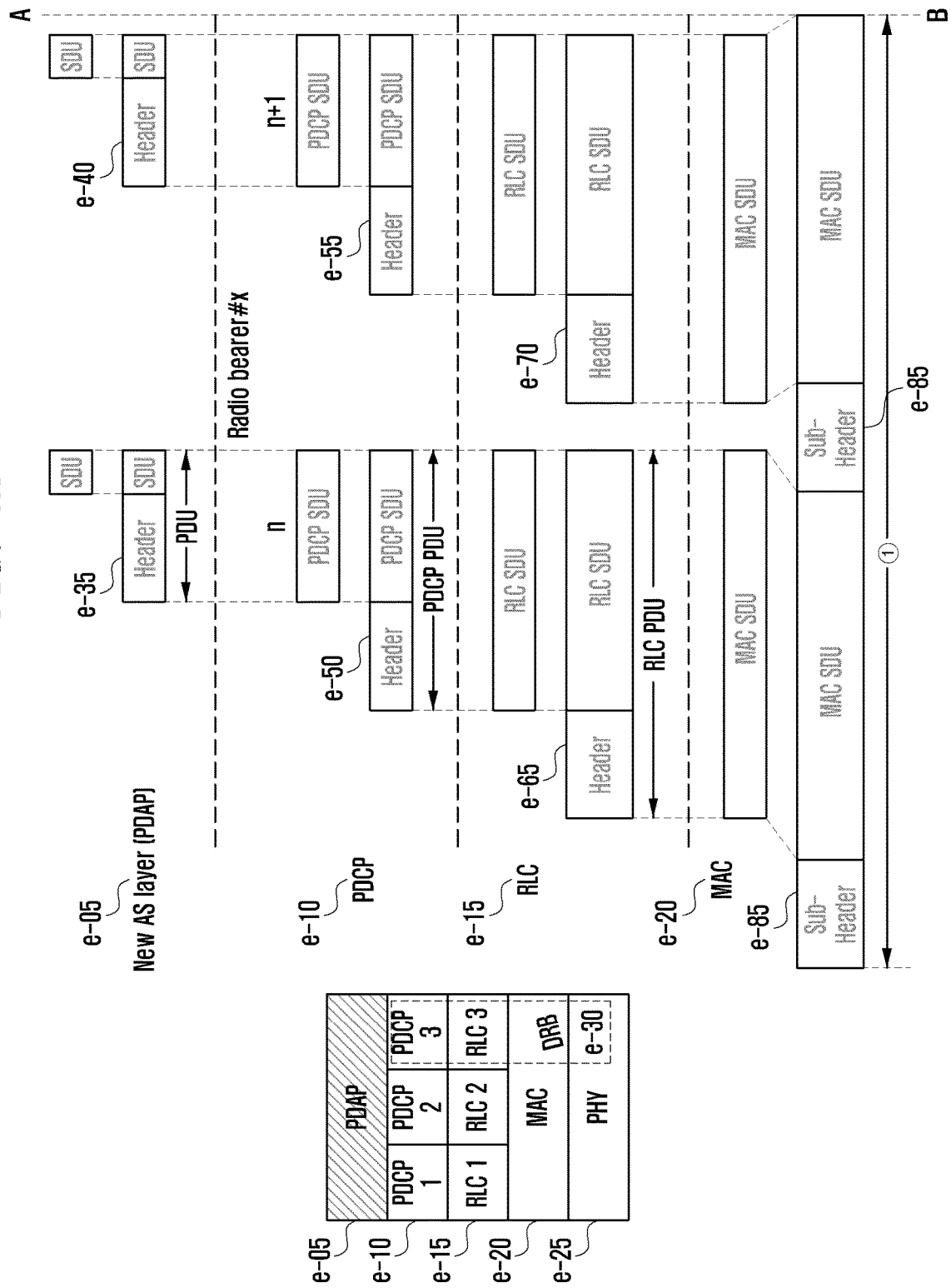
FIGS. 5A and 5B illustrate a protocol stack including a packet data association protocol (PDAP) according to embodiments.
Figure 5B:
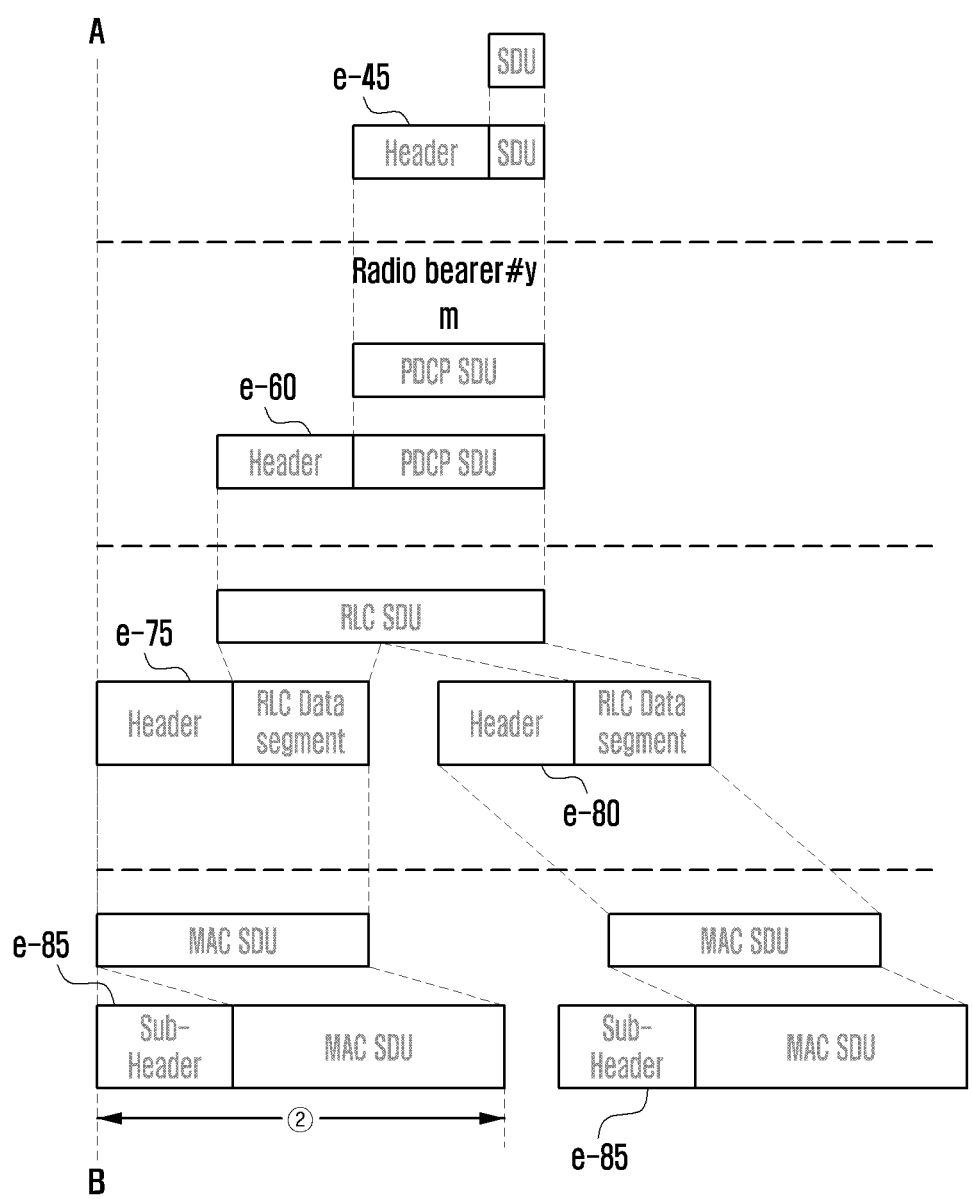

FIG. 5A and FIG. 5B illustrate a protocol stack including a PDAP according to embodiments.

The illustrations of FIG. 5A and FIG. 5B are connected to each other based on line A-B.

In order to handle a new QoS function of an NR system, the following information should be transferred through a wireless interface.

Downlink: QoS flow ID+reflective QoS processing required indicator

Uplink: QoS flow ID

In an NR, an interface transferring the new information to a Uu is used, and a new protocol handling the above-described function is defined on a layer of a PDCP e-10. A PDAP e-05 is not a DRB-based protocol, and a packet is transferred in accordance with a configured mapping rule of a DRB e-30. That is, if IP traffic occurs, the PDAP e-05 performs mapping of an IP flow onto a QoS flow ID, and then performs mapping of the QoS flow ID onto a DRB. The IP traffic is composed of an IP header and a payload, and PDAP headers e-35, e-40, and e-45 may be located in front of or in back of an IP packet. If the PDAP headers e-35, e-40, and e-45 are in front of the IP packet, length information of the PDAP headers e-35, e-40, and e-45 are used when the PDCP e-10 performs header compression, which causes an overhead to occur.

The PDCP e-10 performs IP header compression, and adds the PDCP headers e-50, e-55, and e-60 thereto. Even an RLC e-15 and a MAC e-20 successively add respective RLC headers e-65, e-70, e-75, and e-80 and MAC sub-header e-85, add MAC headers thereto, and then transfer MAC PDU(①+②) to a PHY.

If a gNB determines to apply a reflective mechanism (indicating that a terminal is to send an uplink packet to the DRB to which the QoS flow ID included in the downlink packet has been transferred) to the terminal, the gNB transfers the QoS flow ID and the reflective QoS indicator to the layer of the PDAP e-05 of the downlink packet. The reflective QoS indicator is not directly transferred, but, for indicating whether to perform an operation related to updating a mapping rule, the QoS flow ID is transferred as a substitute for the reflective QoS indicator.

In performing the above-described process, if the gNB includes the QoS flow ID in all data packets to be transferred, the terminal continuously updates a mapping rule through the received QoS flow ID. Accordingly, the gNB interrupts transferring of the QoS flow ID at a certain point.

Figure 6:
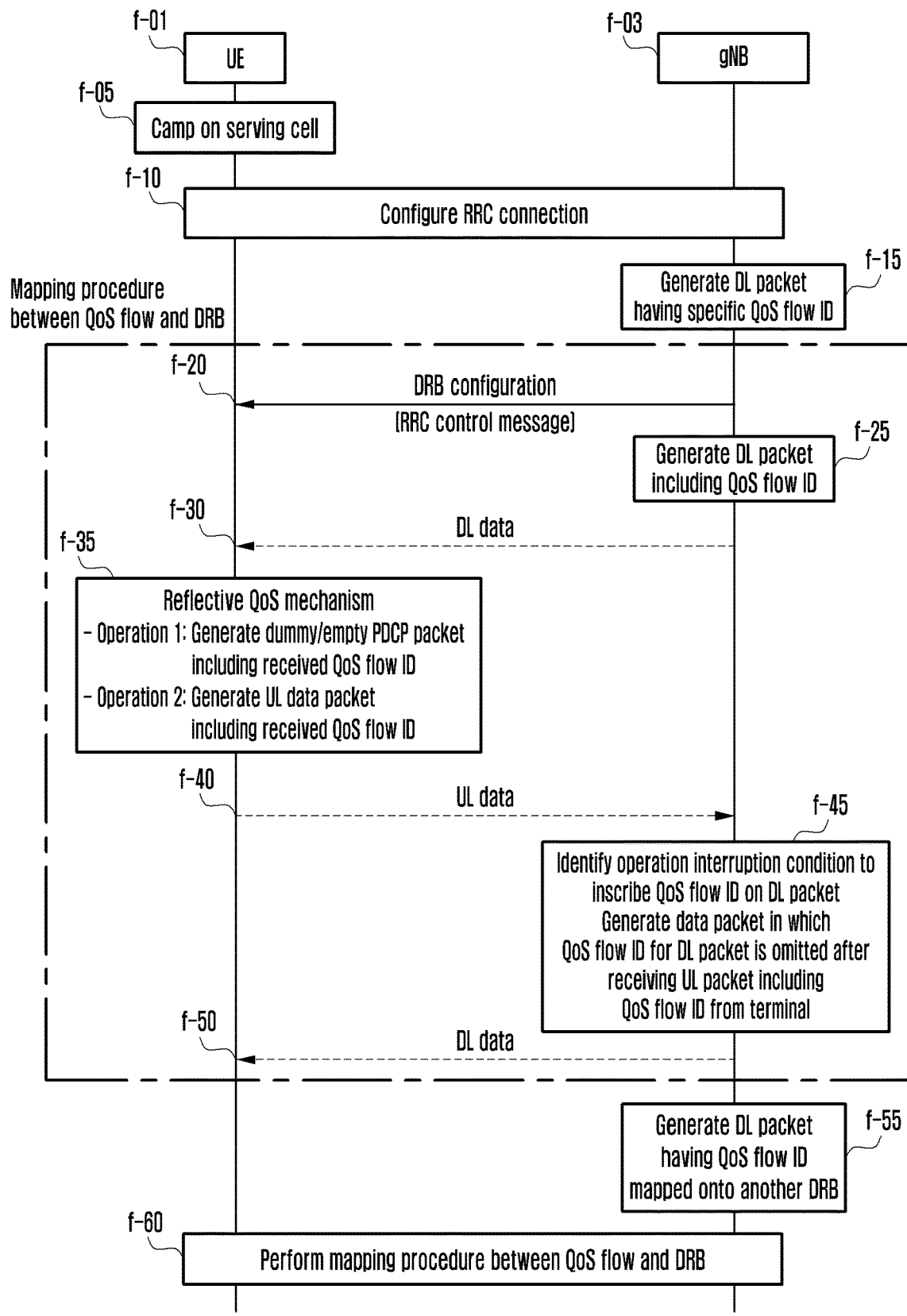
FIG. 6 illustrates a procedure of interrupting marking of a QoS flow ID on a packet transferred from a base station to a terminal according to a first embodiment.

FIG. 6 illustrates a procedure of interrupting marking of a QoS flow ID on a packet transferred from a base station to a terminal according to a first embodiment, which corresponds to when a downlink packet is generated from the base station to the terminal. Respective procedures illustrated in FIG. 6 relate to operations of the terminal described in Table 1 as follows.

TABLE 1

1. If the terminal performs operation 1,
1) gNB receives from the terminal an UL dummy/empty PDCP packet having the same QoS flow ID as that of a downlink (DL) packet transmitted by the gNB.
2. If the terminal performs operation 2,
1) RLC layer of the gNB receives from the terminal a positive acknowledgement (ACK) signal notifying of reception of the PDCP.
2) PDCP layer of the gNB receives a status report notifying that the corresponding PDCP has been received from the terminal and has been removed from a PDCP transmission (Tx) buffer, and construes this as the positive ACK.
3) gNB receives from the terminal user plane packet (data packet) having the same QoS flow ID as that of the DL packet transmitted by the gNB.

Referring to FIG. 6, the terminal (UE) f-01 in an idle mode (RRC_IDLE) searches for a suitable cell to camp on a corresponding base station (gNB) f-03 in step f-05, and accesses the base station f-03 for generation of data to be received in step f-10. In the idle mode, the terminal is not connected to the network for power saving of the terminal, and is unable to transmit data. Accordingly, for the data transmission, the terminal should be shifted to a connection mode (RRC_CONNECTED). "Camping" indicates that the terminal stays in the corresponding cell and receives a paging message to determine whether data is sent on the downlink. If the terminal has succeeded in the connection procedure to the base station f-03, the terminal is shifted to RRC_CONNECTED, and the terminal in the connection mode can perform data transmission/reception with the base station. The base station may generate a downlink packet having a specific QoS flow ID when data to be sent to the terminal f-01 is generated in step f-25.

In an NR system, in order for the base station to configure the DRB to be transmitted to the terminal, there may be a method for the base station to specifically configure the DRB to the terminal through an RRC control message, and a method for marking the QoS flow ID of the corresponding packet on the PDAP header of the downlink packet in steps f-25 and f-30. In this case, the terminal may perform mapping to perform uplink transmission through the DRB on which a downlink packet having a specific QoS flow ID transmitted by the base station is transferred, which is referred to as a reflective QoS operation in step f-35. In performing the reflective QoS operation, two types of operations are disclosed herein, as follows.

1. First operation: Generating a dummy/empty PDCP packet including a QoS flow ID of a received downlink packet 2. Second operation: Marking the QoS flow ID of the received downlink packet on a PDAP header The terminal transmits to the base station an uplink packet generated in step f-40.

The base station determines that the terminal has completed the reflective QoS operation corresponding to the corresponding QoS flow ID through the uplink packet received from the terminal, and determines whether to interrupt an operation of marking the QoS flow ID and a reflective QoS indicator (RQI) on the downlink packet or a method for setting an RQI bit of an SDAP header of the downlink packet to 0 or 1. If existence/nonexistence of the SDAP header is configured through the RRC configuration, the SDAP always exists in the packet, and the operation of setting the RQI bit of the SDAP header of the downlink packet to 0 or 1 is performed. Conditions for the above-described operation may be summarized by the terminal performing a first operation and a second operation as follows.

1. The terminal performs the first operation

The base station receives from the terminal a UL dummy/empty PDCP packet having the same QoS flow ID as that of the downlink packet transmitted by the base station.

2. The terminal performs the second operation

1) An RLC layer of the base station receives from the terminal a positive ACK signal notifying reception of the PDCP corresponding to the downlink packet transmitted by the base station.
2) A PDCP layer of the base station receives from the terminal a status report notifying that the PDCP corresponding to the downlink packet transmitted by the base station is received, and is removed from a PDCP Tx buffer.
3) A user plane (data) packet having the same QoS flow ID as that of the downlink packet transmitted by the base station is received from the terminal.

If the above-described condition is satisfied after receiving the uplink packet including the QoS flow ID from the terminal, the base station generates a data packet in which the QoS flow ID for the downlink packet is omitted in step f-45, and transmits the data packet in step f-50.

As described above, if the existence/nonexistence of the SDAP header is configured through the RRC configuration, the SDAP always exists in the packet, and the operation of setting the RQI bit of the SDAP header of the downlink packet to 0 or 1 is performed. That is, if the above-described condition is satisfied after receiving the uplink packet including the QoS flow ID from the terminal, the base station sets the RQI bit of the SDAP header indicating the reflective QoS operation to 0 to transmit the corresponding data packet to the terminal in step f-50.

This operation indicates that the terminal maintains the previous value without performing the reflective QoS operation, and is for updating the mapping rule.

If the above-described operation is not performed, the base station marks the QoS flow ID on all the downlink packets to transfer the marked downlink packets, and the terminal having received the downlink packet should identify and update the QoS flow ID of the received packet whenever receiving the downlink packet to cause a significant load on the terminal. When a downlink packet having a QoS flow ID mapped onto another DRB is generated in step f-55, the base station newly performs the QoS flow and DRB mapping procedures in steps f-20 to f-50 in parallel in step f-60.

Figure 7:
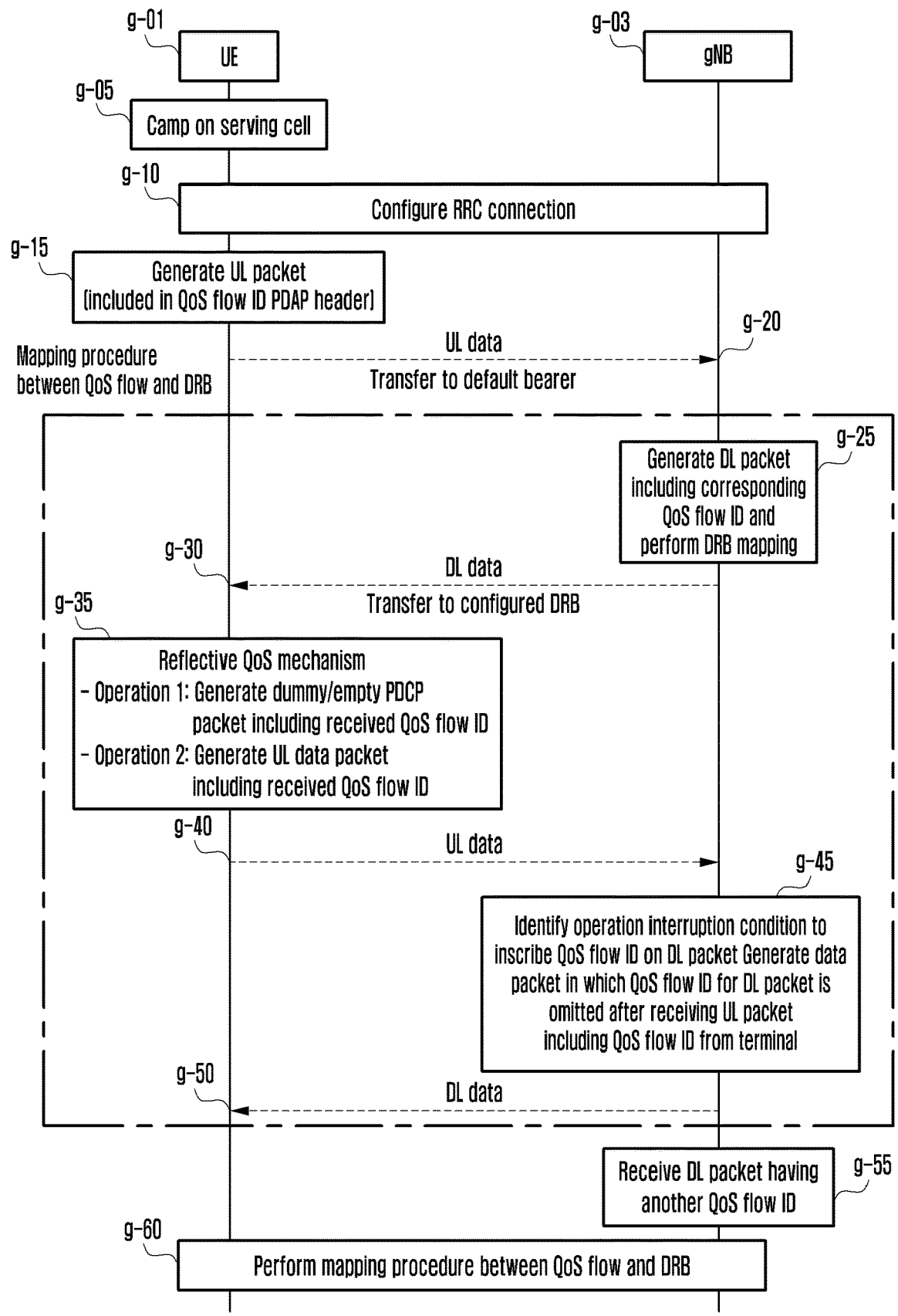
FIG. 7 illustrates a procedure of interrupting marking of a QoS flow ID on a packet transferred from a base station to a terminal according to a second embodiment.

FIG. 7 illustrates a procedure of interrupting marking of a QoS flow ID on a packet transferred from a base station to a terminal according to a second embodiment that corresponds to when an uplink packet is generated from the terminal to the base station. FIG. 7 relates to operations of the terminal described in Table 2 as follows.

TABLE 2

1. If the terminal performs operation 1,
1) gNB receives from the terminal an UL dummy/empty PDCP packet having the same QoS flow ID as that of a DL packet transmitted by the gNB.
2. If the terminal performs operation 2, TABLE 2-continued 1) RLC layer of the gNB receives from the terminal a positive ACK signal notifying of reception of the PDCP.
2) PDCP layer of the gNB receives a status report notifying that the corresponding PDCP has been received from the terminal and has been removed from a PDCP Tx buffer, and construes this as the positive ACK.
3) gNB receives from the terminal user plane packet (data packet) having the same QoS flow ID as that of the DL packet transmitted by the gNB.

The UE g-01 in an idle mode (RRC_IDLE) searches for a suitable cell to camp on a corresponding gNB g-03 in step g-05, and accesses the base station g-03 for generation of data to be transmitted in step g-10. In the idle mode, the terminal is not connected to the network for power saving of the terminal, and is unable to transmit data. Accordingly, for the data transmission, the terminal should be shifted to the RRC_CONNECTED mode. Further, "camping" means that the terminal stays in the corresponding cell and receives a paging message to determine whether data comes on the downlink. If the terminal has succeeded in the connection procedure to the base station g-03, the terminal is shifted to the RRC_CONNECTED mode, in which the terminal can perform data transmission/reception with the base station. The terminal g-01 may generate an uplink packet having a specific QoS flow ID when data to be sent to the base station g-03 is generated in step g-25. In this case, the terminal marks the generated QoS flow ID on the PDAP header, generates the uplink packet in step g-15, and then transfers the uplink data through a default bearer in step g-20.

After receiving the uplink packet through the default bearer, the base station marks a QoS flow ID of a generated downlink packet on the PDAP header, performs mapping of the downlink packet onto the corresponding DRB, and then transmits the downlink packet to the terminal in step g-30. The terminal may perform mapping so that it can perform uplink transmission through the DRB on which a downlink packet having a specific QoS flow ID transmitted by the base station is transferred, which is referred to as a reflective QoS operation in step g-35. The following operations are performed in the reflective QoS operation.

1. First operation: Generating a dummy/empty PDCP packet including a QoS flow ID of a received downlink packet
2. Second operation: Marking the QoS flow ID of the received downlink packet on a PDAP header The terminal transmits to the base station an uplink packet generated in the above operations in step g-40.

The base station determines that the terminal has completed the reflective QoS operation corresponding to the corresponding QoS flow ID through the uplink packet received from the terminal, and determines whether to interrupt an operation of marking the QoS flow ID and an RQI on the downlink packet or a method for setting an RQI bit of an SDAP header of the downlink packet to 0 or 1. If existence/nonexistence of the SDAP header is configured through the RRC configuration, the SDAP always exists in the packet, and the operation of setting the RQI bit of the SDAP header of the downlink packet to 0 or 1 is performed. Conditions for the above-described operation may be summarized by the terminal performing a first operation and a second operation as follows.

1. The terminal performs the first operation

The base station receives from the terminal a UL dummy/empty PDCP packet having the same QoS flow ID as that of the downlink packet transmitted by the base station.

2. The terminal performs the second operation
1) An RLC layer of the base station receives from the terminal a positive ACK signal notifying reception of the PDCP corresponding to the downlink packet transmitted by the base station.
2) A PDCP layer of the base station receives from the terminal a status report notifying that the PDCP corresponding to the downlink packet transmitted by the base station is received, and is removed from a PDCP Tx buffer.
3) A user plane (data) packet having the same QoS flow ID as that of the downlink packet transmitted by the base station is received from the terminal.

If the above-described condition is satisfied after receiving the uplink packet including the QoS flow ID from the terminal, the base station generates a data packet in which the QoS flow ID for the downlink packet is omitted in step g-45, and transmits the data packet in step g-50. As described above, if the existence/nonexistence of the SDAP header is configured through the RRC configuration, the SDAP always exists in the packet, and the operation of setting the RQI bit of the SDAP header of the downlink packet to 0 or 1 is performed. That is, if the above-described condition is satisfied after receiving the uplink packet including the QoS flow ID from the terminal, the base station sets the RQI bit of the SDAP header indicating the reflective QoS operation to 0 to transmit the corresponding data packet to the terminal in step g-50. This operation is for indicating that the terminal maintains the previous value without performing the reflective QoS operation, and for updating the mapping rule.

If the above-described operation is not performed, the base station marks the QoS flow ID on all the downlink packets to transfer the marked downlink packets, and the terminal having received the downlink packet should identify and update the QoS flow ID of the received packet whenever receiving the downlink packet to cause a significant load on the terminal. If a downlink packet having a QoS flow ID mapped onto another DRB is generated in step g-55, the base station newly performs the QoS flow and DRB mapping procedures (steps g-25 to g-50) in parallel in step g-60).

Figure 8A:
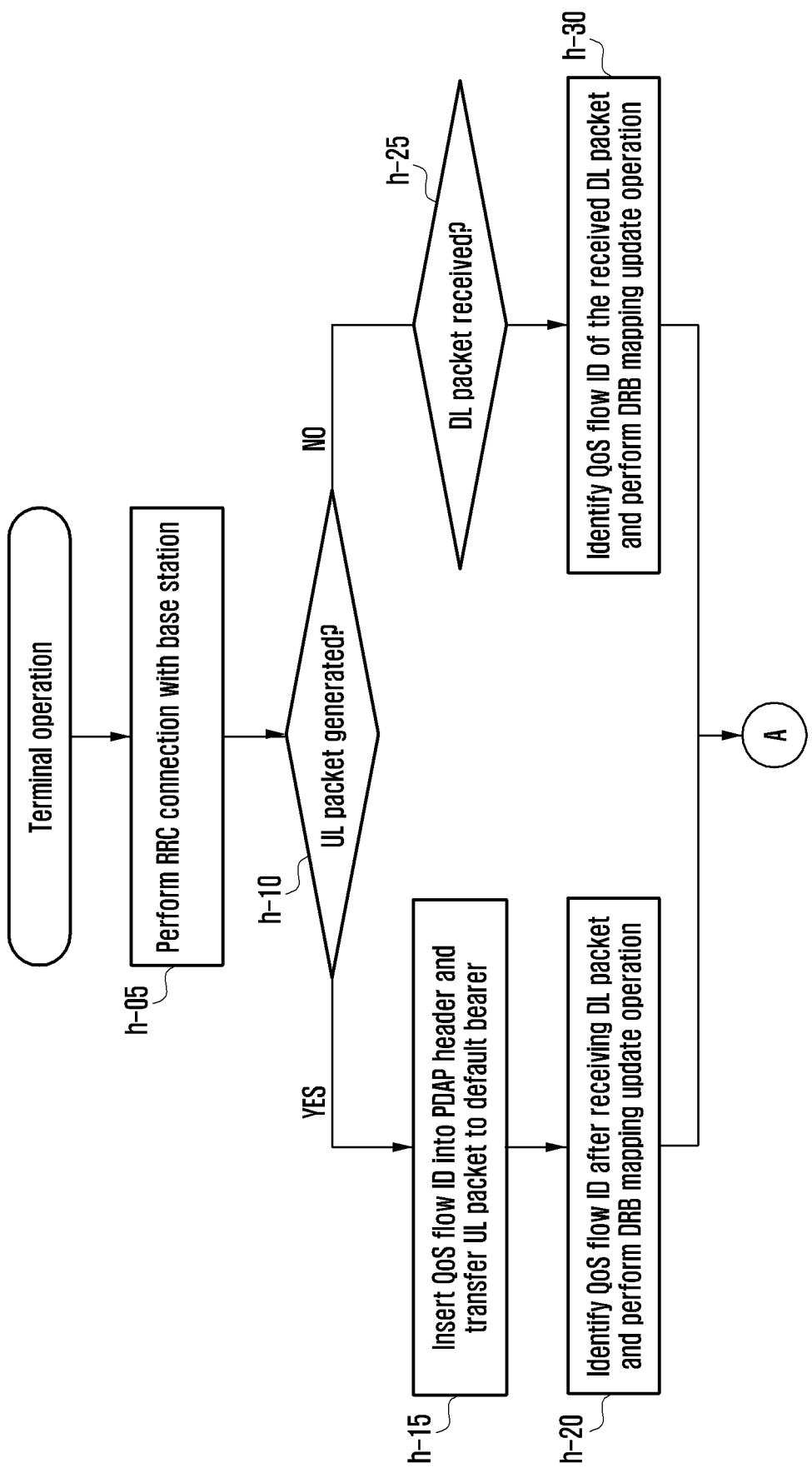
FIGS. 8A and 8B illustrate the overall operation of a terminal performing a reflective QoS operation according to the present disclosure.
Figure 8B:
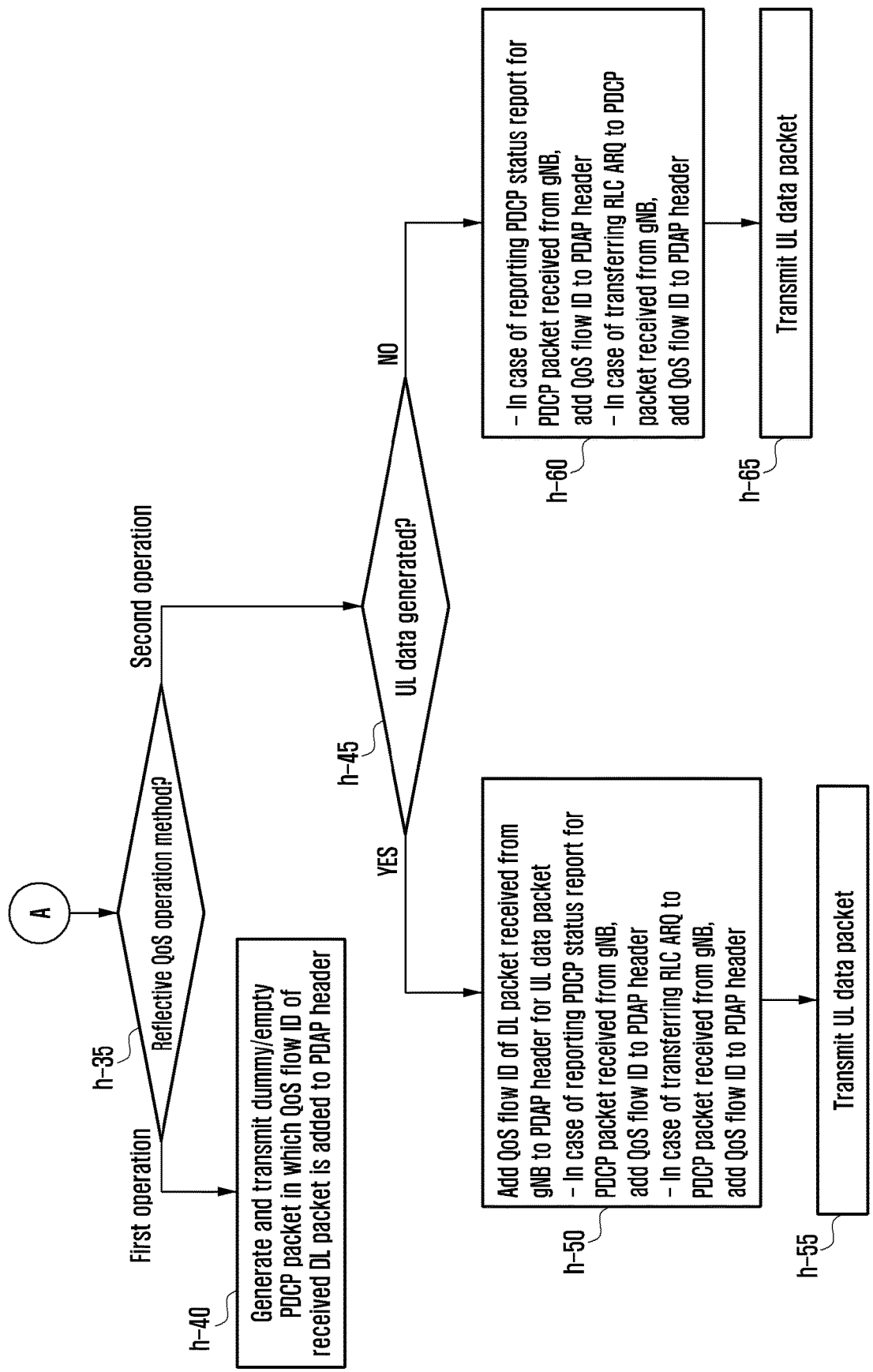

FIG. 8A and FIG. 8B illustrate the overall operation of a terminal performing reflective QoS operation according to an embodiment.

A terminal performs RRC connection to a base station in step h-05, and if an uplink packet is generated in step h-10, the terminal marks a QoS flow ID on a PDAP header of the corresponding packet, and transfers the uplink packet through a default bearer in step h-15. After receiving downlink packet from the base station, the terminal identifies the QoS flow ID of the PDAP header of the corresponding packet, performs DRB mapping and update in step h-20, and transmits subsequent uplink packets to the DRB to which the downlink packet has been transferred. If the downlink packet is generated prior to the uplink packet in step h-25, the terminal identifies the QoS flow ID of the PDAP header of the received downlink packet, performs DRB mapping and update in step h-30, and transmits the subsequent uplink packets to the DRB to which the downlink packet has been transferred.

When transmitting the uplink packet, the terminal may operate in two modes in step h-35. A first method of the terminal is for generating and transmitting an uplink dummy/empty PDCP packet in which the QoS flow ID of the received downlink packet is added to the PDAP header in step h-40, to notify the base station that the terminal has received the downlink packet on which the QoS flow ID is marked, and the base station may interrupt marking of the QoS flow ID on the downlink packet through reception of the packet, or may determine a method for setting an RQI bit of an SDAP header of the downlink packet to 0 or 1. In a second method of the terminal, even if the downlink packet on which the QoS flow ID is marked is received, a packet for notifying of this reception is not generated, but the corresponding QoS flow ID is marked on the subsequent uplink packet to be transferred during generation of the subsequent uplink packet in step h-45.

If the uplink data packet is generated in step h-45, the terminal adds the QoS flow ID of the downlink packet received from the base station to the PDAP header, and transfers the data packet to the base station in step h-50. If a PDCP status should be reported with respect to the PDCP packet received from the base station when or prior to performing the above-described operation, the terminal adds the corresponding QoS flow ID to the PDAP header of the uplink packet to transfer the PDCP packet to the base station. If an RLC ARQ should be transferred for the PDCP packet received from the base station, the terminal adds the corresponding QoS flow ID to the PDAP header of the uplink packet to transfer the header including the QoS flow ID to the base station in steps h-50 and h-55. If the PDCP status report and the RLC ARQ (ACK) are generated, the operations in the LTE may be referenced.

If the PDCP status should be reported with respect to the PDCP packet received from the base station even if the uplink data packet is not generated, the terminal adds the corresponding QoS flow ID to the PDAP header of the uplink packet to transfer the PDCP packet to the base station. If the RLC ARQ should be transferred for the PDCP packet received from the base station, the terminal adds the corresponding QoS flow ID to the PDAP header of the uplink packet to transfer the header including the QoS flow ID to the base station in steps h-60 and h-65. If the PDCP status report and the RLC ARQ (ACK) are generated, the operations in the LTE may be referred to.

FIG. 9 illustrates the overall operation of a base station with mapping a QoS flow ID onto a DRB and interrupting marking of the QoS flow ID in accordance with a message received from a terminal according to an embodiment.

A base station receives an uplink packet from a terminal in step i-05, and identifies existence of an uplink QoS flow ID in step i-10. If the uplink packet is received through a default bearer in step i-15 and the base station determines whether to remap the QoS flow onto another DRB in step i-20, if the base station determines that the QoS flow should be remapped onto another DRB, the base station transfers to the terminal a downlink packet in which a QoS flow ID for the corresponding DRB is omitted or a downlink packet in which the RQI bit of the SDAP header is set to 0 through setting of the RQI bit of the SDAP header to 1 through the newly configured DRB in step i-25.

If the uplink packet is received through the DRB rather than the default bearer in step i-15, the base station transfers to the terminal the downlink packet in which the QoS flow ID for the corresponding DRB is omitted or the downlink packet in which the RQI bit of the SDAP header is set to 0 through the configured DRB in step i-25.

If downlink data having a specific QoS flow ID is generated from an upper layer, the base station generates a downlink packet marked on the PDAP header by setting the QoS flow ID and the RQI bit to 1 in step i-30, and identifies whether to perform DRB change or DRB application in step i-35. To change the DRB, the base station marks on the PDAP header by setting the QoS flow ID and the RQI bit to 1 on the corresponding DRB, and transfers the downlink packet to the terminal in step i-40. However, if it is not necessary to change the DRB, the base station transfers the downlink packet to the terminal without marking the QoS flow ID on the PDAP header on the corresponding DRB or with marking the QoS flow ID on the SDAP and setting the RQI bit of the SDAP header to 0 in step i-45.

Conditions for determining the DRB change may be summarized by the terminal performing a first operation and a second operation as follows.

1. The terminal performs the first operation
   The base station receives from the terminal a UL dummy/empty PDCP packet having the same QoS flow ID as that of the downlink packet transmitted by the base station.
2. The terminal performs the second operation
   1) An RLC layer of the base station receives from the terminal a positive ACK signal notifying reception of the PDCP corresponding to the downlink packet transmitted by the base station.
   2) A PDCP layer of the base station receives from the terminal a status report notifying that the PDCP corresponding to the downlink packet transmitted by the base station is received, and is removed from a PDCP Tx buffer.
   3) A user plane (data) packet having the same QoS flow ID as that of the downlink packet transmitted by the base station is received from the terminal.

Figure 10:
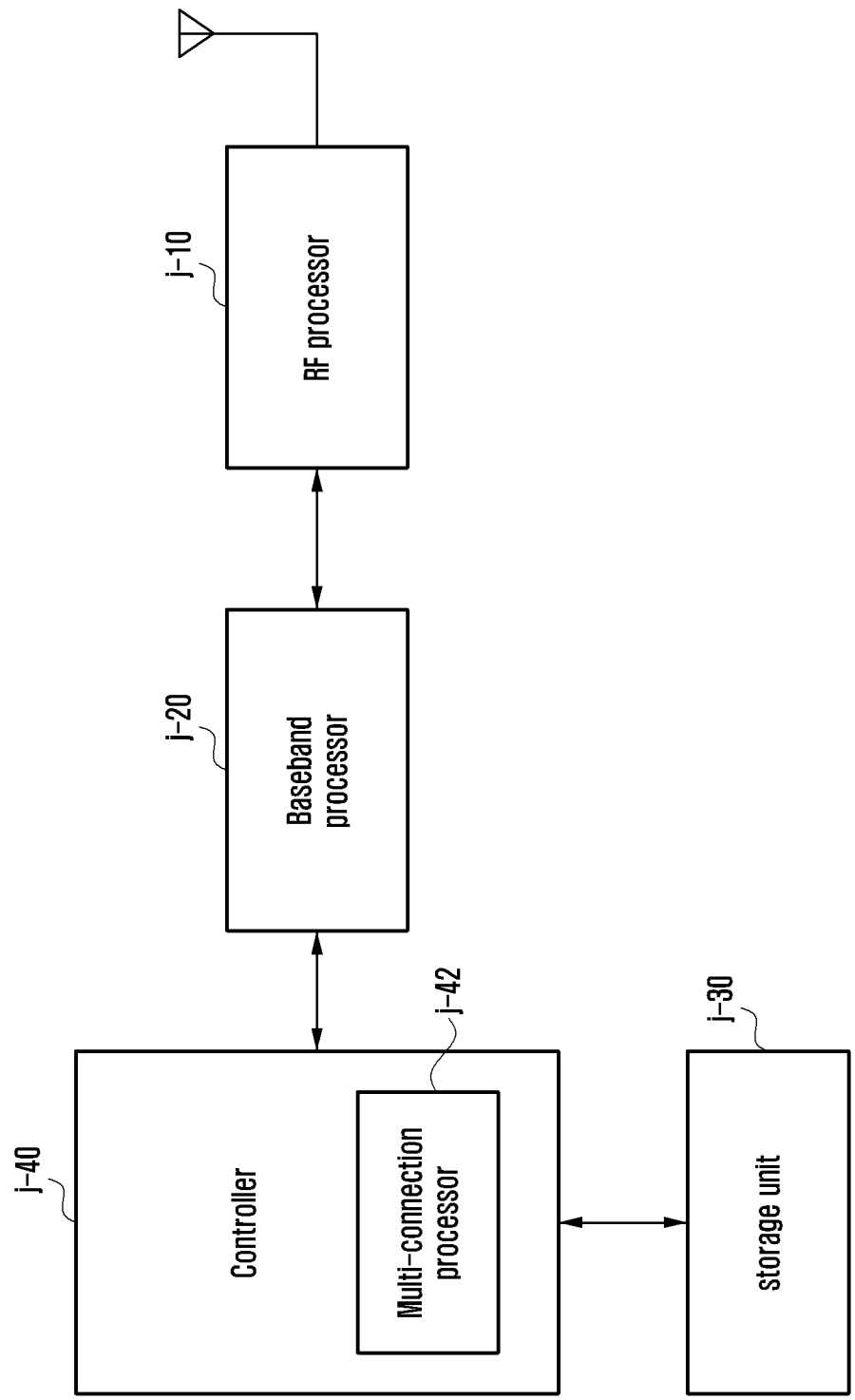
FIG. 10 illustrates the internal structure of a terminal to which the present disclosure is applied.

FIG. 10 illustrates the internal structure of a terminal to which the present disclosure is applied.

Referring to FIG. 10, the terminal includes a radio frequency (RF) processor j-10, a baseband processor j-20, a storage unit j-30, and a controller j-40.

The RF processor j-10 performs a function for transmitting and receiving a signal through a radio channel, such as signal band conversion and amplification. That is, the RF processor j-10 performs up-conversion of a baseband signal provided from the baseband processor j-20 into an RF-band signal to transmit the converted signal to an antenna, and performs down-conversion of the RF-band signal received through the antenna into a baseband signal.

For example, the RF processor j-10 may include a transmission filter, a reception filter, an amplifier, a mixer, an oscillator, a digital-to-analog converter (DAC), and an analog-to-digital converter (ADC). Although only one antenna is illustrated, the terminal may be provided with a plurality of antennas. The RF processor j-10 may include a plurality of RF chains, and may perform beamforming by adjusting phases and sizes of signals transmitted or received through the plurality of antennas or antenna elements. The RF processor j-10 may perform MIMO, may receive several layers during performing of a MIMO operation, may perform reception beam sweeping through proper configuration of the plurality of antennas or antenna elements under the control of the controller, or may control the direction and the beam width of the reception beam so that the reception beam is synchronized with the transmission beam.

The baseband processor j-20 performs conversion between a baseband signal and a bit string in accordance with the physical layer standard of the system. For example, during data transmission, the baseband processor j-20 generates complex symbols by encoding and modulating a transmitted bit string. During data reception, the baseband processor j-20 restores a received bit string by demodulating and decoding the baseband signal provided from the RF processor j-10. For example, when following an OFDM method, during data transmission, the baseband processor j-20 generates complex symbols by encoding and modulating a transmitted bit string, performs mapping of the complex symbols on subcarriers, and then configures OFDM symbols through an inverse fast Fourier transform (IFFT) operation and a cyclic prefix (CP) insertion.

During data reception, the baseband processor j-20 divides the baseband signal provided from the RF processor j-10 in the unit of OFDM symbols, restores the signals mapped on the subcarriers through an FFT operation, and then restores the received bit string through demodulation and decoding.

The baseband processor j-20 and the RF processor j-10 transmit and receive the signals as described above, and may be referred to as a transmitter, a receiver, a transceiver, or a communication unit. At least one of the baseband processor j-20 and the RF processor j-10 may include a plurality of communication modules in order to support different radio connection technologies.

In order to process signals of different frequency bands, at least one of the baseband processor j-20 and the RF processor j-10 may include different communication modules. For example, the different radio connection technologies may include an LTE network and an NR network, and different frequency bands may include super high frequency (SHF), such as a 2.1 NRHz or 1 NRHz band and millimeter wave (mmWave), such as a 60 GHz band.

The storage unit j-30 stores therein a basic program for an operation of the terminal, application programs, and data of setup information, and provides stored data in accordance with a request from the controller j-40.

The controller j-40 controls the entire operation of the terminal, such as transmitting and receiving signals through the baseband processor j-20 and the RF processor j-10. The controller j-40 records or reads data in or from the storage unit j-30, and thus, may include at least one processor such as a communication processor (CP) performing a control for communication or an application processor (AP) controlling an upper layer, such as an application program.

Figure 11:
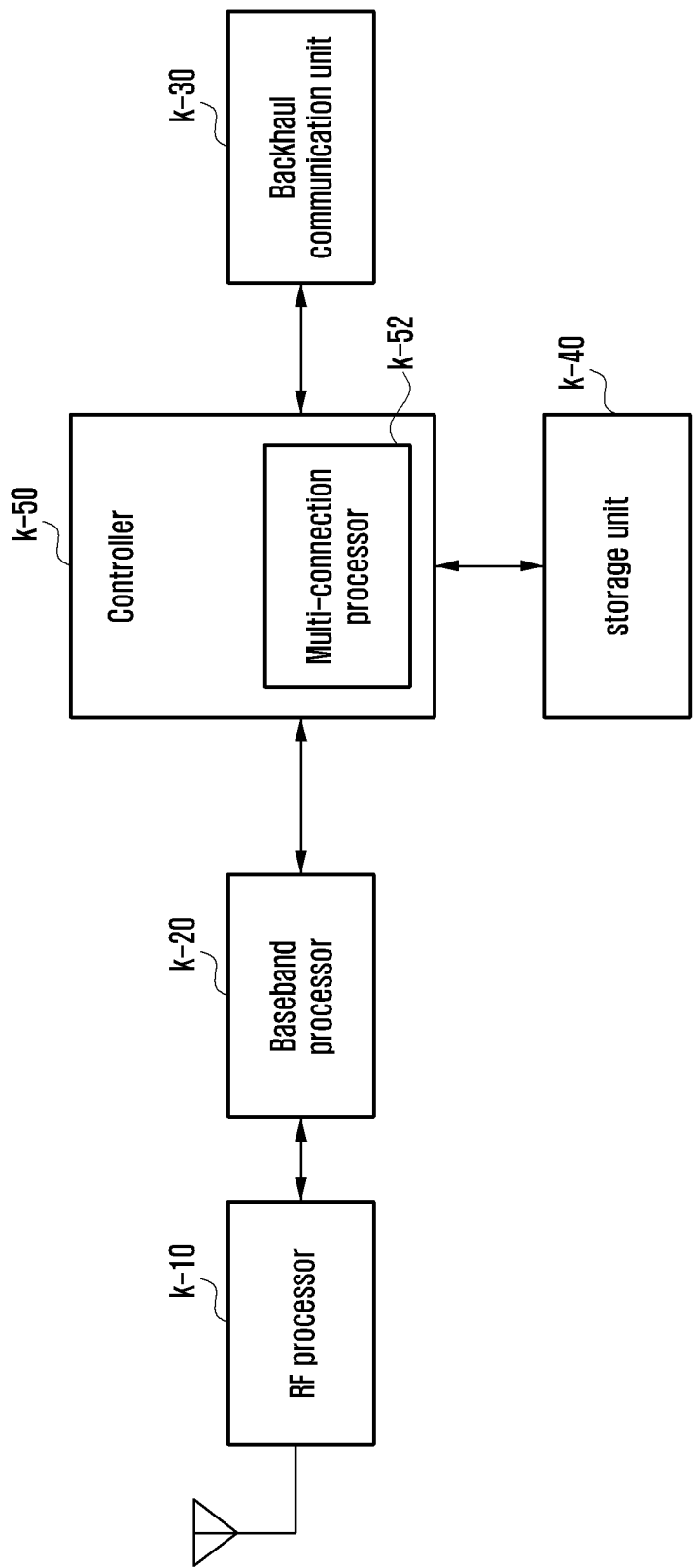
FIG. 11 illustrates the configuration of an NR base station according to an embodiment.

FIG. 11 illustrates the configuration of an NR base station according to an embodiment.

In FIG. 11, the base station includes an RF processor k-10, a baseband processor k-20, a backhaul communication unit k-30, a storage unit k-40, and a controller k-50.

The RF processor k-10 performs a function for transmitting and receiving a signal through a radio channel, such as signal band conversion and amplification. That is, the RF processor k-10 performs up-conversion of a baseband signal provided from the baseband processor k-20 into an RF-band signal to transmit the converted signal to an antenna, and performs down-conversion of the RF-band signal received through the antenna into a baseband signal.

For example, the RF processor k-10 may include a transmission filter, a reception filter, an amplifier, a mixer, an oscillator, a digital to analog converter (DAC), and an analog to digital converter (ADC). Although only one antenna is illustrated, the first connection node may be provided with a plurality of antennas. The RF processor k-10 may include a plurality of RF chains, and may perform beamforming by adjusting phases and sizes of signals transmitted or received through the plurality of antennas or antenna elements. The RF processor may perform a down MIMO operation through transmission of one or more layers.

The baseband processor k-20 performs conversion between a baseband signal and a bit string in accordance with the physical layer standard of the first radio connection technology. For example, during data transmission, the baseband processor k-20 generates complex symbols by encoding and modulating a transmitted bit string. During data reception, the baseband processor k-20 restores a received bit string by demodulating and decoding the baseband signal provided from the RF processor k-10. For example, when following an OFDM method, during data transmission, the baseband processor k-20 generates complex symbols by encoding and modulating a transmitted bit string, performs mapping of the complex symbols on subcarriers, and then configures OFDM symbols through the IFFT operation and CP insertion.

During data reception, the baseband processor k-20 divides the baseband signal provided from the RF processor k-10 in the unit of OFDM symbols, restores the signals mapped on the subcarriers through the FFT operation, and then restores the received bit string through demodulation and decoding. The baseband processor k-20 and the RF processor k-10 transmit and receive the signals as described above, and may be referred to as a transmitter, a receiver, a transceiver, or a wireless communication unit.

The backhaul communication unit k-30 provides an interface for performing communication with other nodes in the network, converts a bit string that is transmitted from a main base station to another node, such as an auxiliary base station or a core network, into a physical signal, and converts a physical signal that is received from another node into a bit string.

The storage unit k-40 stores therein a basic program for an operation of the main base station, application programs, and data of setup information. In particular, the storage unit k-40 may store information on a bearer allocated to the connected terminal and the measurement result reported from the connected terminal, and information that becomes a basis of determination whether to provide or suspend a multi-connection to the terminal. The storage unit k-40 provides stored data in accordance with a request from the controller k-50.

The controller k-50 controls the entire operation of the main base station, such as transmitting and receiving signals through the baseband processor k-20 and the RF processor k-10 or through the backhaul communication unit k-30, and recording or reading data in or from the storage unit k-40. For this, the controller k-50 may include at least one processor.

The following are aspect of the present disclosure as described above.

A method for reducing a processing load between a base station and a terminal when applying a flow-based QoS flow ID 1. A method for a base station to conditionally include a QoS flow ID
   Through the above-described operation, the terminal less receives the QoS flow ID, and the reflective QoS operation load of the terminal is reduced.
   A method for interrupting marking of the QoS flow ID on a downlink packet after identifying that the QoS flow ID is included in an uplink packet received from the terminal
   When receiving from the terminal a UL dummy/empty PDCP packet having the same QoS flow ID as that of the downlink packet transmitted by the base station when the terminal performs the first operation on the first condition of the base station operation,
   When the terminal performs the second operation on the second condition of the base station operation,
   1) An RLC layer of the base station receives from the terminal a positive ACK signal notifying reception of a PDCP corresponding to a downlink packet transmitted by the base station.
   2) A PDCP layer of the base station receives from the terminal a status report notifying that a PDCP corresponding to a downlink packet transmitted by the base station is received, and is removed from a PDCP Tx buffer.
   3) A user plane (data) packet having the same QoS flow ID as that of a downlink packet transmitted by the base station is received.
2. A method for a terminal to perform reflective QoS operation
   As the first operation of the terminal, a method for transferring to a base station a UL dummy/empty PDCP packet having the same QoS flow ID as that of a downlink packet transmitted by the base station.
   As the second operation of the terminal, a method for marking on a PDAP header the same QoS flow ID as that of a downlink packet transmitted by the base station when an uplink data packet of the terminal is generated.
3. A method for mapping a QoS flow ID onto a DRB
4. A method for performing reflective QoS operation depending on a QoS flow ID on a PDAP header While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method by a base station in a wireless communication system, the method comprising:
   transmitting, to a terminal, a first packet including a first header related to a data radio bearer;
   receiving, from the terminal, a second packet corresponding to the first packet; and
   generating a third packet based on the second packet, wherein in case the second packet indicates that a reflective quality of service (QoS) operation of the terminal is completed, the third packet is generated by omitting a quality of service (QoS) flow identifier (ID), or is generated to include a second header including a reflective QoS indicator to indicate that the terminal is not to update information on the data radio bearer; and
   transmitting, to the terminal, the third packet indicating that the terminal is not to update information on the data radio bearer.

2. The method of claim 1, wherein the second packet indicating that the reflective QoS operation of the terminal is completed is a dummy packet including a header, and
   wherein the header of the dummy packet includes a quality of service (QoS) flow identifier (ID) included in the first packet.

3. The method of claim 1, wherein the second packet indicating that the reflective QoS operation of the terminal is completed is an uplink data packet including a header, and
   wherein the header of the uplink data packet includes a quality of service (QoS) flow identifier (ID) included in the first packet.

4. The method of claim 3, wherein the uplink data packet comprises at least one of packet data convergence protocol status report information for a packet received from the base station, radio link control automatic repeat request reception response information, and user information.

5. A method by a terminal in a wireless communication system, the method comprising:
  receiving, from a base station, a first packet including a header which includes a quality of service (QoS) flow identifier (ID) and a reflective QoS indicator;
  mapping the QoS flow ID to a data radio bearer to which the first packet is transmitted and storing the mapped QoS flow ID;
  transmitting, to the base station, a second packet corresponding to the first packet; and
  receiving, from the base station, a third packet generated based on the second packet,
  wherein in case the second packet indicates that a reflective QoS operation of the terminal is completed, the QoS flow ID is omitted in the third packet or the third packet includes a second header including a reflective QoS indicator indicating that the terminal is not to update information on the data radio bearer.

6. The method of claim 5, wherein the predetermined condition includes the second packet indicating that the reflective QoS operation of the terminal is completed is a dummy packet including a header, and
  wherein the header of the dummy packet includes the QoS flow ID included in the first packet.

7. The method of claim 5, wherein the second packet indicating that the reflective QoS operation of the terminal is completed is an uplink data packet including a header, and
  wherein the header of the uplink data packet includes the QoS flow ID included in the first packet.

8. The method of claim 7, wherein the uplink data packet comprises at least one of packet data convergence protocol status report information for a packet received from the base station, radio link control automatic repeat request reception response information, and user information.

9. A base station in a wireless communication system, the base station comprising:
  a transceiver; and
  a controller coupled with the transceiver and configured to control the transceiver to:
    transmit, to a terminal, via the transceiver, a first packet including a first header related to a data radio bearer,
    receive, from the terminal, via the transceiver, a second packet corresponding to the first packet, and
    generate a third packet based on the second packet, wherein in case the second packet indicates that a reflective quality of service (QoS) operation of the terminal is completed, the third packet is generated by omitting a quality of service (QoS) flow identifier (ID), or is generated to include a second header including a reflective QoS indicator to indicate that the terminal is not to update information on the data radio bearer, and
    transmit, to the terminal via the transceiver, the third packet indicating that the terminal is not to update information on the data radio bearer.

10. The base station of claim 9, wherein the second packet indicating that the reflective QoS operation of the terminal is completed is a dummy including a header, and
  wherein the header of the dummy packet includes packet including a quality of service (QoS) flow identifier (ID) included in the first packet.

11. The base station of claim 9, wherein the second packet indicating that the reflective QoS operation of the terminal is completed is an uplink data packet including a header, and
  wherein the header of the uplink data packet includes a quality of service (QoS) flow identifier (ID) included in the first packet.

12. The base station of claim 11, wherein the uplink data packet comprises at least one of packet data convergence protocol status report information for a packet received from the base station, radio link control automatic repeat request reception response information, and user information.

13. A terminal by a wireless communication system, the terminal comprising:
  a transceiver; and
  a controller coupled with the transceiver and configured to control the transceiver to:
    receive, from a base station, via the transceiver, a first packet including a first header which includes a quality of service (QoS) flow identifier (ID) and a reflective QoS indicator,
    map the QoS flow ID to a data radio bearer to which the first packet is transmitted and store the mapped QoS flow ID,
    transmit, to the base station, via the transceiver, a second packet corresponding to the first packet, and
    receive, from the base station, via the transceiver, a third packet generated based on the second packet,
  wherein in case the second packet indicates that a reflective QoS operation of the terminal is completed, the QoS flow ID is omitted in the third packet or the third packet includes a second header including a reflective QoS indicator indicating that the terminal is not to update information on the data radio bearer.

14. The terminal of claim 13, wherein the second packet indicating that the reflective QoS operation of the terminal is completed is a dummy packet including a header, and
  wherein the header of the dummy packet includes the QoS flow ID included in the first packet.

15. The terminal of claim 13, wherein the second packet indicating that the reflective QoS operation of the terminal is completed is an uplink data packet including a header, and
  wherein the header of the uplink data packet includes the QoS flow ID included in the first packet.

16. The terminal of claim 15, wherein the uplink data packet comprises at least one of packet data convergence protocol status report information for a packet received from the base station, radio link control automatic repeat request reception response information, and user information.

* * * * *